U S011767175B2

(12) United States Patent
Hampe et al.

(10) Patent No.: US 11,767,175 B2
(45) Date of Patent: Sep. 26, 2023

(54) CONVEYOR ARRANGEMENT WITH INTEGRATED SENSOR FUNCTION UNIT

(71) Applicant: Interroll Holding AG, Sant' Antonino (CH)

(72) Inventors: Andreas Hampe, Hückelhoven (DE); Herbert Henze, Hückelhoven (DE); Carsten Chabrié, Hückelhoven (DE)

(73) Assignee: Interroll Holding AG, Sant' Antonino (CH)

( * ) Notice: Subject to any disclaimer, the term of this patent is extended or adjusted under 35 U.S.C. 154(b) by 213 days.

(21) Appl. No.: 17/312,010

(22) PCT Filed: Dec. 19, 2019

(86) PCT No.: PCT/EP2019/086242
§ 371 (c)(1),
(2) Date: Jun. 9, 2021

(87) PCT Pub. No.: WO2020/127687
PCT Pub. Date: Jun. 25, 2020

(65) Prior Publication Data
US 2022/0009722 A1 Jan. 13, 2022

(30) Foreign Application Priority Data
Dec. 21, 2018 (DE) .......................... 102018133481.8

(51) Int. Cl.
*B65G 43/08* (2006.01)
*B65G 13/06* (2006.01)
*B65G 23/08* (2006.01)
(52) U.S. Cl.
CPC .............. *B65G 43/08* (2013.01); *B65G 13/06* (2013.01); *B65G 23/08* (2013.01); *B65G 2203/0233* (2013.01); *B65G 2203/0291* (2013.01); *B65G 2203/044* (2013.01)

(58) Field of Classification Search
CPC ........ B65G 43/08; B65G 13/06; B65G 23/08; B65G 2203/0233; B65G 2203/0291; B65G 2203/044
(Continued)

(56) References Cited
U.S. PATENT DOCUMENTS 4,813,572 A * 3/1989 Schmidt .............. G07F 17/0078
99/357
5,245,150 A * 9/1993 Grandi ................ G07F 17/0078
221/6
(Continued)

FOREIGN PATENT DOCUMENTS

CN 107108129 A 8/2017
CN 108190409 A 6/2018
(Continued)

OTHER PUBLICATIONS

WO 2019115454 A1 to Hampe et al. (Year: 2019).*
JP WO2016125898 A1 (Year: 2016).*
WO 2019115454 A (Year: 2019).*

*Primary Examiner* — Gene O Crawford
*Assistant Examiner* — Lester Rushin, III
(74) *Attorney, Agent, or Firm* — Michael Soderman

(57) ABSTRACT

The invention relates to a conveyor arrangement (1) for conveying a conveyed material, comprising a motor-driven conveyor roller (100), comprising a roller body (10) mounted so as to be able to rotate about a roller axis (A), a drive unit (20) arranged inside the roller body (10), coupled mechanically to the roller body (10) and an axle element (16) and designed to generate a torque between the axle element (16) and the roller body (10), a sensor function unit (40) arranged inside the roller body (10) and designed to sense a conveyed material to be conveyed by the motor-driven conveyor roller (100), and a control unit (30) that is connected to the sensor function unit (40) in order to
(Continued)

transmit signals, wherein the control unit (30) is designed to receive a sensor signal from the sensor function unit and to transmit a control signal to the drive unit (20) depending on the sensor signal, wherein the control signal contains data for driving the motor-driven conveyor roller, in a conveyor mode, with a characteristic profile that is predefined by the control signal.

10 Claims, 4 Drawing Sheets

(58) Field of Classification Search
USPC .................................................. 198/781.1
See application file for complete search history.

(56) References Cited

U.S. PATENT DOCUMENTS

| | | | | |
|---|---|---|---|---|
| 6,206,181 B1* | 3/2001 | Syverson | ............ | H02K 7/1016 |
| | | | | 198/784 |
| 7,542,823 B2* | 6/2009 | Nagai | ............ | B65G 47/261 |
| | | | | 198/781.05 |
| 8,757,363 B2* | 6/2014 | Combs | ............ | B65G 43/10 |
| | | | | 198/781.01 |
| 10,945,562 B2* | 3/2021 | Bauer | ............ | G07F 11/58 |
| 2003/0168316 A1* | 9/2003 | Knepple | ............ | B65G 47/30 |
| | | | | 198/460.1 |
| 2003/0209410 A1 | 11/2003 | Itoh et al. | | |

FOREIGN PATENT DOCUMENTS

| | | |
|---|---|---|
| CN | 108357850 A | 8/2018 |
| DE | 29515825 U1 | 12/1995 |
| DE | 102015106034 A1 | 10/2016 |
| DE | 102016120415 A1 | 4/2018 |
| EP | 0953524 A2 | 11/1999 |
| GB | 668631 A | 3/1952 |
| JP | 2000038205 A | 2/2000 |
| JP | 2004026503 A | 1/2004 |
| JP | 200978874 A | 4/2009 |
| WO | 2018024917 A2 | 2/2018 |

* cited by examiner

CONVEYOR ARRANGEMENT WITH INTEGRATED SENSOR FUNCTION UNIT

CROSS REFERENCE TO RELATED APPLICATIONS

This application is the U.S. national stage of International Application No. PCT/EP2019/086242, filed on 2019 Dec. 19. The international application claims the priority of DE 102018133481.8 filed on 2018 Dec. 21; all applications are incorporated by reference herein in their entirety.

BACKGROUND

The invention relates to a conveying arrangement, a conveying device, a motor-operated conveying roller, and a method for conveying a conveyed material.

In a conveying arrangement, a motor-operated conveying roller is used. It is often the case that multiple conveying arrangements are installed in a conveying device. The conveying device is commonly constructed from multiple conveying zones which are passed through in succession along a conveying path by an article for conveying, the conveyed material. Here, each conveying zone has at least one motor-operated conveying roller and generally further conveying rollers. A conveying arrangement may form such a conveying zone as part of the conveying path. By means of this construction, multiple articles can be conveyed simultaneously in the conveying device, and contact between individual items of conveyed material can be avoided by virtue of the motor-operated conveying rollers of the individual conveying zones being activated correspondingly. This implements so-called zero pressure accumulation conveying, which is nowadays sought in many applications in order to ensure a high level of certainty against damage of the conveyed material.

For example, it is known for a motor-operated conveying roller to be activated in zero pressure accumulation, single discharge configuration. In this operating mode, the conveying roller is activated so as to convey an item of conveyed material in its conveying zone only when the adjacent conveying zone downstream in the conveying direction is free, that is to say is not occupied by a further item of conveyed material. Another zero pressure accumulation manner of operation is the so-called block discharge mode. In the block discharge mode, all motor-operated conveying rollers along adjacent conveying zones are activated simultaneously such that, even in the case of adjacent conveying zones being occupied with items of conveyed material, conveying without contact is possible because the conveying zone into which an item of conveyed material is being conveyed simultaneously conveys out the item of conveyed material that was previously in said conveying zone.

By means of zero pressure accumulation conveying, damage to the articles can be reliably prevented even though these are conveyed in closely spaced succession in a row along the conveying path. Problems here are both that parameters that are relevant for the conveying on the part of the conveying arrangement may change over the course of operation, and that such influential parameters are also variable on the part of the conveyed article. For example, the friction coefficient between the conveying roller and the conveyed article may change as a result of wear, contamination and different material conditions of the underside of the article, which leads to a greater or lesser degree of slippage. In order to prevent damage to the articles that can arise specifically in the case of multiple articles backed up one against the other owing to an action of the cumulated conveying forces on the foremost article, it is therefore known to monitor the position of the front and rear ends of the articles.

For this monitoring, sensors arranged above the conveying rollers are essential, and it is already known for motor-operated conveying rollers of such conveying arrangements to be controlled in a manner dependent on a sensor signal of such sensors. Commonly, for this purpose, light barriers are arranged along the conveying path, which light barriers are fastened, laterally with respect to the conveying path, to a frame in which the conveying rollers are rotatably mounted.

Here, in the prior art, one sensor is provided for each conveying zone. The motor-operated conveying roller of the conveying zone is activated in a manner dependent on a sensor signal of such a sensor. The sensor signal, or the value thereof, is dependent on whether and when the sensor detects an item of conveyed material.

In order to utilize a sensor signal of such a sensor for controlling a motor-operated conveying roller, it is common to establish corresponding wired data transmissions from the sensor to a central control unit and from the central control unit to the motor-operated conveying roller. It is furthermore known to transmit the sensor signal of the sensor of one or more decentralized control units that are arranged along the conveying path. These decentralized control systems arranged along the conveying path are coupled to one another for signal transmission.

A disadvantage of this prior art is firstly the considerable associated outlay on cabling. Furthermore, such sensors arranged along the conveying path, and the corresponding cabling, are exposed to environmental influences that can entirely prevent, disrupt or at least restrict the detection of the conveyed material for conveying. In particular, the sensors and also the cabling can be damaged, for example during installation, maintenance or servicing work. Such disruptions can on the one hand lead to a conveying device being brought to a complete standstill, which, in particular in logistics centres or post distribution centres, leads to considerable costs and delays in the process. On the other hand, these disruptions can lead to a built-up pressure accumulation in the conveying path, which leads to damage to the items of conveyed material.

SUMMARY

It is thus a general aim to provide a conveying arrangement, a motor-operated conveying roller and a conveying device, which in the operating state reliably allows damage-free conveying of the items of conveyed material.

Said object is achieved by means of a conveying arrangement of the type described in the introduction, comprising a motor-operated conveying roller, comprising a roller body mounted rotatably about a roller axis, a drive unit which is arranged within the roller body and which is mechanically coupled to the roller body and to an axle element and which is designed to generate a torque between the axle element and the roller body, a sensor function unit which is arranged within the roller body and which is designed to detect a conveyed material for conveying by means of the motor-operated conveying roller, and a control unit which is connected, for the transmission of signals, to the sensor function unit, wherein the control unit is designed to receive a sensor signal from the sensor function unit and to transmit a control signal to the drive unit in a manner dependent on the sensor signal, wherein the control signal comprises data for the drive of the motor-operated conveying roller with a characteristic profile, which is predetermined by the control signal, in a conveying operating mode.

DETAILED DESCRIPTION

With the conveying arrangement according to the invention, a sensor function unit is arranged within a roller body of a motor-operated conveying roller. The sensor function unit is designed to generate a sensor signal, in a manner dependent on which the drive unit of a motor-operated conveying roller is activated. In particular, the sensor signal signals the absence or presence of the conveyed material for conveying. In a manner dependent on the sensor signal of a conveying arrangement, it is also possible for one or more drive units of motor-operated conveying rollers of conveying arrangements positioned downstream and/or upstream in the conveying direction to be activated by means of the control unit. The conveying arrangement may also be activated in a manner dependent on a sensor signal of a conveying arrangement positioned upstream or downstream in the conveying direction. Here, the sensor signal may be an analogue or a digital signal, and the control unit may be designed to process a correspondingly analogue or digital signal.

The sensor function unit is preferably designed to detect mechanical and/or electrical and/or electromagnetic and/or optical measurement variables. Such measurement variables represent, for example, changes in weight on the motor-operated conveying roller, deformations of the motor-operated conveying roller, changes in the brightness or light conditions at the motor-operated conveying roller, or changes in electrical or electromagnetic variables, in particular electrical or electromagnetic operating variables of the drive unit, at or in the vicinity of the motor-operated conveying roller. For example, the sensor function unit is a load cell, a strain gauge, an optical sensor, a capacitive sensor or an inductive sensor or a combination of these. Furthermore, the sensor function unit may be designed to detect a rotational speed and/or a torque.

It is conceivable for the motor-operated conveying roller to have multiple sensor function units or multiple sensors. In particular, the motor-operated conveying roller comprises multiple sensors for detecting various measurement variables.

It is preferably provided that the sensor function unit is designed in a suitable manner for use at the operating temperatures that are commonly generated or reached, and/or which commonly prevail, during the operation of the motor-operated conveying roller. In particular, the sensor function unit is designed for use at operating temperatures of at least −30° C., −20° C., −10° C., 0° C. and at most +20° C., +30° C., +40° C., +50° C. In this preferred development, the sensor function unit is preferably arranged on rotatably mounted elements of the motor-operated conveying roller, for example the roller body. It may however also be preferred for the sensor function unit to be arranged on elements of the motor-operated conveying roller which are not rotatably mounted, for example the axle element.

The sensor function unit is connected in terms of signal transmission to the control unit, and the control unit is connected in terms of signal transmission to the drive unit. The control unit is preferably connected in terms of signal transmission to one or more drive units of motor-operated conveying rollers of conveying arrangements positioned downstream and/or upstream in the conveying direction. The control unit may be designed as a decentralized control unit that is coupled in terms of signal transmission to further control units, in particular decentralized control units, for example for the transmission of the sensor signal. Furthermore, the control unit may be designed as a central control unit that is coupled in terms of signal transmission to multiple conveying arrangements, in particular each conveying arrangement of a conveying device, or to the drive units of the motor-operated conveying rollers.

In a manner dependent on the sensor signal, the control unit generates a control signal with which the drive unit is activated. For this purpose, the control signal comprises data with a characteristic profile, which is predetermined by the control signal, in a conveying operating mode, the control sequence. The characteristic profile is preferably selected from a drive torque, and/or a drive torque profile, and/or a speed, and/or a speed profile, and/or a braking torque, and/or a braking torque profile, and/or a direction of rotation, and/or conveying throughput, and/or accumulation notification, and/or a combination of two or more of these characteristics. It is furthermore preferred that the control unit forms the control signal in a manner dependent on the sensor signal and in a manner dependent on a deviation of an actual characteristic profile from the predetermined characteristic profile. For this purpose, it is provided that the predetermined characteristic profile is compared with the actual characteristic profile. The control unit is preferably designed to compare the predetermined characteristic profile with the actual characteristic profile.

Consequently, the conveying arrangement is assigned a control unit fully designed to control a conveying process by means of the motor-operated conveying roller on the basis of a predetermined characteristic profile. With the conveying arrangement, it is thus possible to implement a conveying process along an entire conveying path through corresponding programming of the control unit, in the case of which, for example, the drive unit is activated on the basis of a supplied sensor signal and the conveying path can be controlled in this way. Furthermore, in this way, one or more conveying arrangements positioned upstream and/or downstream in the conveying direction can perform conveying of a conveyed material without the need here for a further superordinate control unit and correspondingly required signal transmission to and from said superordinate control unit.

The sensor function unit within the roller body is protected in a particularly suitable manner against damage and environmental influences such as moisture, dust, greases, changing light conditions etc. In particular, the roller body protects the sensor function unit against damage as a result of improper handling during installation, maintenance or servicing work. Furthermore, this arrangement allows the sensor function unit to be installed under defined manufacturing conditions, which on the one hand reduces the number of incorrectly installed sensor function units and on the other hand means that the sensor installation no longer has to be performed during the construction of a conveying device. In particular, such motor-operated conveying rollers pre-installed with a sensor function unit particularly preferably minimize the outlay for the alignment and calibration of the sensor function unit. The sensor function unit may for example comprise an ultrasound sensor or a microwave sensor. The sensor function unit may be formed with these sensors or other sensors in order to detect a state outside the roller body, for example to detect the presence or absence of conveyed material above the roller, as a binary signal.

Furthermore, such conveying arrangements according to the invention are, owing to the compact design, suitable in particular for fields of use where there are stringent requirements with regard to hygiene.

According to the first preferred embodiment, it is provided that the control unit is arranged within the roller body.

In this preferred embodiment, within the roller body, there is arranged a control unit which may be designed in particular for controlling the conveying process by means of the motor-operated conveying roller on the basis of a sensor signal. The conveying arrangement or motor-operated conveying roller thus requires no further control unit, to which it is connected and from which it receives control signals, arranged outside the roller body.

Furthermore, it is preferably provided that the control unit is designed in a suitable manner for use at the operating temperatures that are commonly reached or generated during the operation of the motor-operated conveying roller. In particular, the control unit is designed for use at operating temperatures of at least −30° C., −20° C., −10° C., 0° C. and at most +20° C., +30° C., +40° C., +50° C. In this preferred development, the sensor function unit may preferably be arranged on rotatably mounted elements of the motor-operated conveying roller, for example the roller body. It may also be preferred for the sensor function unit to be arranged on elements of the motor-operated conveying roller which are not rotatably mounted, for example the axle element. It is furthermore possible for a control unit to comprise the sensor function unit.

The control unit within the roller body is protected in a particularly suitable manner against damage and environmental influences such as moisture, dust, greases, changing light conditions etc. In particular, the roller body protects the control unit against damage as a result of improper handling during installation, maintenance or servicing work. Furthermore, this arrangement allows the sensor function unit to be installed under defined manufacturing conditions, which on the one hand can reduce the number of incorrectly installed sensor function units and on the other hand means that the control unit no longer has to be installed during the construction of a conveying device.

Furthermore, the outlay both for the installation and for the servicing and maintenance is advantageously reduced— the control unit arranged within the roller body allows a direct connection, which is made during the manufacture of the motor-operated conveying roller, to the drive unit, that is to say minimizes the outlay on cabling.

It is furthermore preferred that the sensor function unit provides an analogue signal as sensor signal.

In particular, the sensor function unit is designed to provide a voltage signal or a current signal as analogue signal. In this preferred embodiment, it is provided that the control unit is designed to process analogue signals provided by the sensor function unit. The roller body advantageously shields the sensor function unit and in particular the analogue signal against disturbances and thus makes it possible to provide a sensor signal with low noise components (disturbance signals).

In a further preferred embodiment, it is provided that the drive unit comprises or is itself the sensor function unit, and/or the sensor function unit comprises or is itself a sensor separate from the drive unit.

In one embodiment of this preferred development, the drive unit is or comprises the sensor function unit. In this preferred embodiment, it is possible in particular for a voltage applied to the drive unit, a current applied to the drive unit and/or a magnetic field applied to the drive unit to be the sensor signal provided by the sensor function unit. Furthermore, in this preferred embodiment, the sensor signal may correspond to a rotational speed, a torque and/or a temperature. This embodiment advantageously requires no additional sensors. This minimizes in particular the costs and the outlay for installation and reduces the outlay for potentially pending servicing work.

In a particularly preferred embodiment, the sensor function unit comprises a sensor which is separate from the drive unit, in particular a further sensor which is separate from the drive unit. This embodiment is suitable in particular for detecting various measurement variables at or in the vicinity of the motor-operated conveying roller. In this way, it is possible in particular for the drive unit to be activated much more precisely, and for a conveying process to be implemented along an entire conveying path. Furthermore, the embodiment is suitable—for example for particularly safety-critical fields of use—for detecting for example the presence or absence of a conveyed material for conveying in a redundant and thus particularly fail-safe manner.

A further preferred embodiment comprises an analogue-digital converter unit which is designed to convert the sensor signal into a digital signal, wherein the control unit comprises the analogue-digital converter unit, and/or the sensor function unit comprises the analogue-digital converter unit.

In this preferred embodiment, the conveying arrangement comprises an analogue-digital converter unit. The analogue-digital converter unit is designed to convert an analogue sensor signal, for example a voltage applied to the drive unit, a current applied to the drive unit and/or a magnetic field applied to the drive unit into a digital signal for further processing in the control unit. A sampling frequency with which the analogue-digital converter unit samples the analogue signal is preferably settable in a manner dependent on the frequency of the sensor signal. In particular, the sampling frequency is settable in a manner dependent on a predetermined characteristic profile to be selected, that is to say in a manner dependent on the control signal.

The analogue-digital converter unit preferably converts the analogue sensor signal into a digital signal on the basis of the counting method, the serial method or by means of a parallel converter. Such a digitally prepared sensor signal is suitable for transmission in bus systems. In particular, the digital signal is suitable for computer-assisted processing. Furthermore, the sensor signal that has been converted into a digital signal advantageously allows activation of the drive unit which is more reliable in respect of environmental influences, in particular disturbance signals, and thus ensures a more reliable conveying process.

It is furthermore preferred that the control unit, for transmitting the sensor signal, is connected directly to the sensor function unit by means of a signal line, and/or, for activating the drive unit, is connected to the latter via a control line, and/or, for receiving the control signals and/or for transmitting operating data of the conveying arrangement, is connected to a bus line.

In this preferred embodiment, the control unit is connected to the sensor function unit, and the control unit is connected to the drive unit, via signal lines. The signal lines are preferably designed for transmitting digital signals.

The control unit is in particular designed to generate operating data and transmit said data via the bus line. This processing of the operating data allows signalling of the operating state of the motor-operated conveying roller, such that other components involved in the conveying process, such as further conveying arrangements, can define their control behaviour using said operating data. The exchange of operating data, with which an operating state of one motor-operated conveying roller can become an operating state of a further motor-operated conveying roller, thus allows, in a conveying system, control of the individual motor-operated conveying rollers with fully implemented control intelligence, without the need for a central or decentralized control unit outside the motor-operated conveying roller for this purpose.

The operating data may also be data which originate from a motor-driven conveying roller arranged adjacent to the motor-operated conveying roller and which signal the operating state of said adjacent motor-driven conveying roller. The control unit may thus be designed to receive operating data of a motor-driven conveying roller positioned upstream and/or downstream in the conveying direction, that is to say to signal whether said adjacent motor-operated conveying rollers are driven or are at a standstill. For this purpose, the operating data of the respective conveying arrangement preferably have a predetermined identical data structure.

It is furthermore also preferable that the conveying arrangement comprises a power interface in order to receive a power supply in the form of a voltage supply with a voltage.

The power interface is preferably designed for a voltage supply with a voltage of 24 V, in particular of 48 V. In particular, the power interface is designed for a voltage supply for the control unit and/or the drive unit and/or the sensor function unit. The conveying arrangement preferably comprises a single power interface. It is furthermore possible for the conveying arrangement to have two or more power interfaces.

It is furthermore preferred that the drive unit comprises a brushless electric motor and the control unit comprises commutation electronics for activating the electric motor.

It is basically consequently preferred that the control unit is also designed for electronically commutating the electric motor in the drive unit. This avoids a situation in which electronic commutation takes place outside the motor-operated conveying roller and a corresponding large number of differentiated signals has to be introduced into the roller body via differentiated signal lines. Instead, the often spatially limited introduction of signals into the roller body can take place via a small number of signal lines and can thus be of correspondingly robust and compact configuration.

It is furthermore also preferred that the control unit has a memory unit in which there are stored one or more characteristics and/or one or more characteristic profiles, wherein each characteristic profile is assigned an individual binary coding, and the control unit is designed to compare a received sensor signal with the individual binary codings and to activate the drive unit with a characteristic profile which is assigned an individual coding that corresponds to the received sensor signal.

In this embodiment, the control unit has a memory unit as electronic memory, which stores one or a multiplicity of characteristics or characteristic profiles. These characteristic profiles describe a particular drive behaviour of the motor-operated conveying roller, for example acceleration or braking, a maximum speed or corresponding profiles, and may consequently generally describe the profile of the speed of the motor-operated conveying roller over the course of time. A characteristic profile is however also to be understood to mean a logical behaviour of the motor-operated conveying roller, which provides for example a particular characteristic in a manner dependent on a sensor signal and/or operating data, that is to say consequently reflects a logical programming of the motor-operated conveying roller. For example, programming for the operation of the motor-operated conveying roller in a single discharge or block discharge mode may be stored as a characteristic profile. It is basically possible for multiple characteristic profiles to be stored in the memory unit in order to be selected through corresponding retrieval by means of comparison of a sensor signal with the individual binary coding and to then be used for the operation of the motor-operated conveying roller. The memory unit may however also be designed such that a single characteristic profile is stored therein during the course of programming, and said single characteristic profile is used for the operation of the motor-operated conveying roller.

According to a further preferred embodiment, it is provided that the control unit is designed to receive a bus-coded programming signal and, by means of the programming signal, to store a logical dependency between a sensor signal and a characteristic, and/or a logical dependency between a sensor signal and a characteristic profile, and/or a characteristic profile, in a memory unit.

In this embodiment, by means of a programming signal which is received by the control unit, and which may be characterized by a control sequence assignment or by a sequence of programming commands, a corresponding control sequence for the conveying roller is implemented. This implementation may be performed through concrete programming on the basis of the sequence of programming commands, or may take place by virtue of a pre-programmed control sequence stored in the memory being retrieved and assigned on the basis of the control sequence assignment. The control sequence itself may be formed by a logical dependency between a sensor signal and a characteristic profile; here, it is self-evident that more advanced dependencies, for example of further sensor signals of drive units positioned upstream or downstream in the conveying direction, are also conceivable as a control sequence to be stored. It is likewise possible for corresponding profiles of drive characteristics to be stored logically in a manner dependent on a sensor signal or else in a manner dependent on a sensor signal profile and used as a basis for the control. Finally, a programming signal may also serve for storing only one characteristic of a characteristic profile, which is then, through corresponding logical combinations, used for a control sequence of the conveying roller, that is to say, for example, is set into a control sequence in a manner dependent on a sensor signal through further logical dependencies.

It is particularly preferred here if the programming command is bus-coded. This firstly makes it possible for the programming command to be transmitted via a bus line, and secondly, in this way, the targeted programming of particular conveying rollers that are connected to the bus line is made possible.

In a further preferred embodiment, it is provided that the control unit is designed to switch the drive unit back and forth between a standby operating mode and a conveying operating mode in a manner dependent on a sensor signal and/or a control signal.

In the conveying operating mode, it is preferably provided that the control unit activates the drive unit in a manner dependent on the selected characteristic profile such that the motor-operated conveying roller rotates with a substantially constant speed, and/or with a speed which increases from an actual speed to a setpoint speed, or with a speed which decreases from an actual speed to a setpoint speed. In the standby operating mode, the drive unit of the motor-operated conveying roller is preferably not driven. In the standby operating mode, however, it is preferably provided that the control unit can directly activate the drive unit, for the drive of the motor-operated conveying roller, in a manner dependent on a sensor signal. In particular, in the standby operating mode, the drive unit is not fully shut down.

It is furthermore preferred that the drive unit switches from the standby operating mode into the conveying operating mode if the sensor signal signals a change from a free space to an occupied space or from an occupied space to a free space in a conveying direction, and/or the drive unit switches from the conveying operating mode to the standby operating mode if the sensor signal signals a change from a free space to an occupied space or from an occupied space to a free space in the conveying direction.

Furthermore, an embodiment is also preferred which comprises a conveying roller and a belt drive, wherein, for the drive of the conveying roller, the motor-operated conveying roller is connected to the conveying roller by means of the belt drive.

In this preferred embodiment, it is provided that the motor-operated conveying roller drives the conveying rollers by means of the belt drive. The belt drive is for example a V belt, a poly-V belt or a round belt. In particular, it is provided that the sensor function unit is designed to detect a rotational movement of the conveying rollers that are passively driven by the motor-operated conveying roller by means of the belt drive. The rotational movement of a passively driven conveying roller may preferably correspond to a sensor signal, in a manner dependent on which the drive unit is activated.

According to a further aspect of the invention, the object is achieved by means of a conveying device of the type described in the introduction, comprising one or more conveying arrangements according to any of the above-described embodiments of a conveying arrangement.

According to a third aspect of the invention, the object is achieved by means of a motor-operated conveying roller of the type described in the introduction, comprising a roller body mounted rotatably about a roller axis, a drive unit which is arranged within the roller body and which is mechanically coupled to the roller body and to an axle element and which is designed to generate a torque between the axle element and the roller body, a control unit which is arranged within the roller body and which is designed to receive a control signal and, in a manner dependent on the control signal, to activate the drive unit for drive with a characteristic predetermined by the control signal, a sensor function unit arranged within the roller body, wherein the control unit is designed to receive a sensor signal of the sensor function unit via a signal line, and wherein the control unit comprises an analogue-digital converter unit in order to convert the sensor signal received via the signal line into a digital signal and in order to transmit the sensor signal, which has been converted into a digital signal, from the roller body preferably via a bus line.

According to a fourth aspect of the invention, the object is achieved by means of a method of the type described in the introduction, comprising the steps of providing a conveying device according to an above-described embodiment, and/or detecting a conveyed material for conveying, and/or switching one or more conveying arrangements from a standby operating mode to a conveying operating mode, and/or conveying the conveyed material.

According to a first preferred embodiment, it is provided that the conveying comprises conveying in a single discharge mode or conveying in a block discharge mode.

It is even further preferred that the conveying of the conveyed material for conveying comprises, in a manner dependent on the selected characteristic profile, conveying with a substantially constant speed, and/or with a speed which increases from an actual speed to a setpoint speed, and/or with a speed which decreases from an actual speed to a setpoint speed.

The method according to the invention may be carried out in particular by means of the conveying arrangement discussed above. It is furthermore to be understood that the method according to the invention may in particular preferably be developed so as to have or allow those method steps which are provided by above-discussed developments of the control device according to the invention.

With regard to the advantages, design variants and design details of these further aspects and of the possible developments thereof, reference is made to the above description relating to the corresponding features of the conveying arrangement for conveying a conveyed material.

BRIEF DESCRIPTION OF THE DRAWINGS

Preferred embodiments of the invention will be discussed by way of example on the basis of the appended figures. In the figures, identical or substantially functionally identical or similar elements are denoted by the same reference designations. In the figures.

DETAILED DESCRIPTION OF THE PREFERRED EMBODIMENTS

Figure 1:
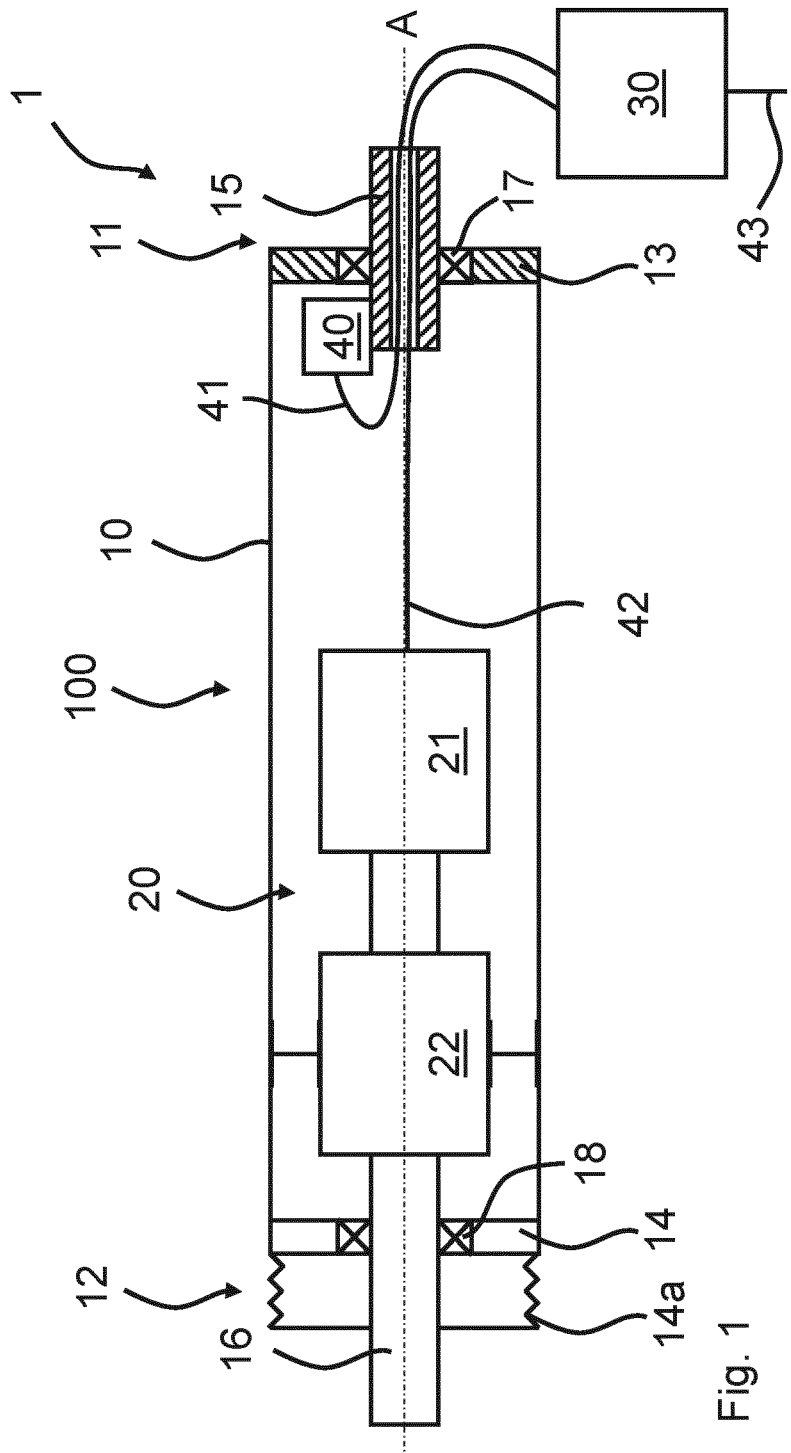
FIG. 1 shows a longitudinally sectioned view of a preferred exemplary embodiment of the conveying arrangement according to the invention.
Figure 2:
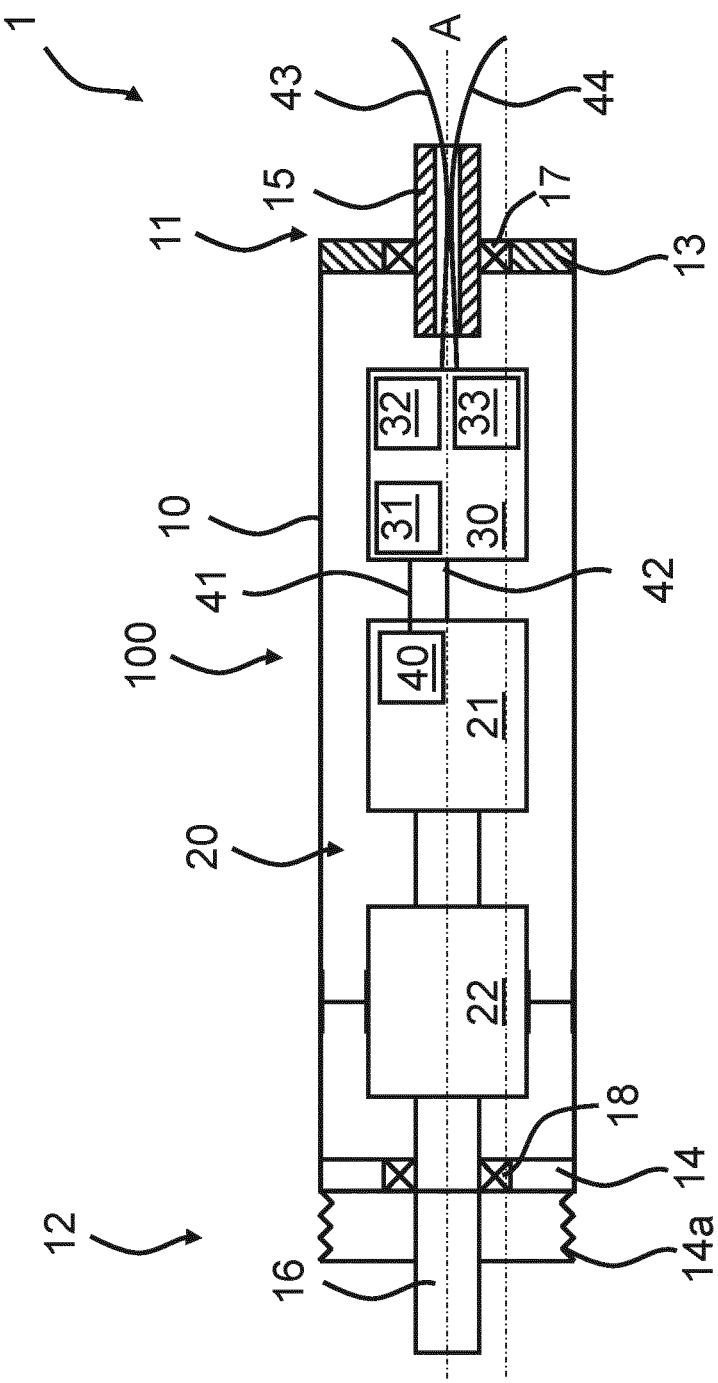
FIG. 2 shows a longitudinally sectioned view of a further preferred exemplary embodiment of the conveying arrangement according to the invention.

Referring to FIGS. 1 and 2, a conveying arrangement 1 having a motor-operated conveying roller 100 is shown, which has a roller body 10, out of which, at the respective end sides, a first axle element 15 and a second axle element 16 project. The motor-operated conveying roller can be mounted by means of these axle elements in a frame 103 that extends along a conveying path. Here, the two axle elements 15, 16 are mounted fixedly in terms of torque in the frame 103. The roller body 10 is mounted rotatably about said axle elements 15, 16. This rotatable mounting is realized by means of a first rolling bearing 17, which is fastened in an end cap 13 inserted at the first end 11 of the roller body and which mounts the roller body 10 rotatably on the first axle element 15. Furthermore, at the second end 12 of the roller body, there is inserted an end cap 14 in which there is mounted a second rolling bearing 18 which mounts the roller body 10 rotatably on the second axle element 16. Here, the second end cap 14 additionally has, integrally therewith, a circumferential surface which projects axially out of the roller body and which, by means of multiple encircling grooves 14a, allows a torque to be output by means of a poly-V belt 102 to other adjacently situated conveying rollers 101 that do not have a dedicated motor drive. In this way, the motor-operated conveying roller 100 can be used in a conveying zone with multiple passively driven rollers 101, and serves for driving said passively driven conveying rollers 101 in the conveying zone. In the present exemplary embodiment, a conveying arrangement 1 is a conveying zone.

In the interior space of the roller body 10, there is furthermore arranged a drive unit 20 which can generate a torque between one of the two, or both, axle elements 15, 16 and the roller body 10. The axle on which the roller body 10 is rotatably mounted is formed in the embodiment shown by the two axle elements 15, 16, which are in the form of axle stubs. It would alternatively also be possible for a continuous axle that extends through the roller body to be provided. The drive unit 20 may comprise an electric motor 21 which directly generates the torque and which is consequently coupled by means of the stator fixedly in terms of torque to one or both axle elements 15, 16 and by means of the rotor coupled fixedly in terms of torque to the roller body 10. The drive unit 20 may furthermore also comprise a transmission 22 in order to step down the rotational speed of the electric motor 21 and increase the torque thereof. For example, planetary transmissions or spur-gear transmissions may be used and jointly incorporated into the torque-transmitting chain between the axle stub or the axle elements 15, 16 and the roller body 10 with the electric motor 21.

The drive unit 20 is activated by a control unit 30 in a manner dependent on a sensor function unit 40. Said control unit 30 may, in the case of a brushless electric motor 21, have commutation electronics. In particular, the control unit 30 is however designed to make logical control decisions on the basis of a received sensor signal and possibly in a manner dependent on operating data. Such a control unit 30 may be arranged, on the one hand, as in the exemplary embodiment shown in FIG. 1, outside the roller body 10 or, on the other hand, as in the exemplary embodiment shown in FIG. 2, within the roller body 10. As can be seen from FIG. 1, from the control unit 30 that is situated outside, a signal line 41 is led through a longitudinal bore in the axle element 15 to a sensor function unit 40 that is situated within the roller body. Furthermore, a line 42 is led through the axle element 15 to the electric motor 21, which line supplies power to, and activates, the electric motor. It is basically possible for said lines 41, 42 to be in the form of analogue signal lines and to correspondingly transmit analogue signals from the control unit to the electric motor and from the sensor to the control unit—and vice versa. Alternatively, the signal transmission between control unit and sensor or electric motor respectively may take place in the form of a digital signal and in particular in the form of a bus signal, which then necessitates the presence of corresponding decoding circuits at the sensor and electric motor within the roller body.

The control unit 30 shown in the exemplary embodiment of FIG. 2 comprises a memory unit 32. In the memory unit 32, invariant characteristic values of the motor-operated conveying roller 100, such as the serial number thereof or the step-down ratio of the transmission thereof, may be stored and serve for data transmission to further motor-operated conveying rollers or to a further, for example superordinate control unit. Furthermore, sensor signals provided by the sensor function unit 40 may be stored. Furthermore, in the memory unit 32, there may be stored variable operating data of the motor-operated conveying roller 100, such as the number of operating hours thereof, characteristic values for characterizing operating temperatures, such as maximum temperature reached, and likewise characteristic values for characterizing rotational speeds, torques and the like. These stored data may serve for being transmitted from the roller body in order to transmit characteristic data relating to the motor-operated conveying roller to a signal receiver, for example of a control unit of a further conveying arrangement, situated outside the roller body.

Furthermore, in the memory unit 32, one or more control sequences may be stored in a manner dependent on a characteristic profile, in accordance with which control sequences the control unit activates the drive unit 20 in a dependent manner and in accordance with logical combination of sensor data of the sensor function unit 40 and possibly operating data of a motor-operated conveying roller 100. For example, a control sequence for a single discharge mode may be stored, a control sequence for a block discharge mode may be stored, or these two types of control sequences may be stored with different characteristics, for example conveying speeds, acceleration ramps, drive torque profile and the like. On the one hand, these different control sequences are externally programmable into the control unit 30 by means of a corresponding feed of data, and the control unit may correspondingly, for programming, be designed to receive a corresponding programming signal. In particular, by means of the programming signal, a logical dependency between a sensor signal and a characteristic, a logical dependency between a sensor signal and a characteristic profile and also a control sequence, can be programmed and stored in a memory unit 32. Alternatively, the characteristic profile may also be stored in the memory unit 32 and, as a result of a receipt of a corresponding sensor signal, read out of the memory unit 32 by the control unit 30 and then used for the control sequences of the drive unit 20. In this case, each control sequence is assigned a corresponding sensor signal, and the control unit 30 is designed to carry out a corresponding comparison. For the logical data processing and sequence control, the control unit comprises a data processing unit (CPU) 33 with commutation electronics for the brushless electric motor 21.

Figure 4:
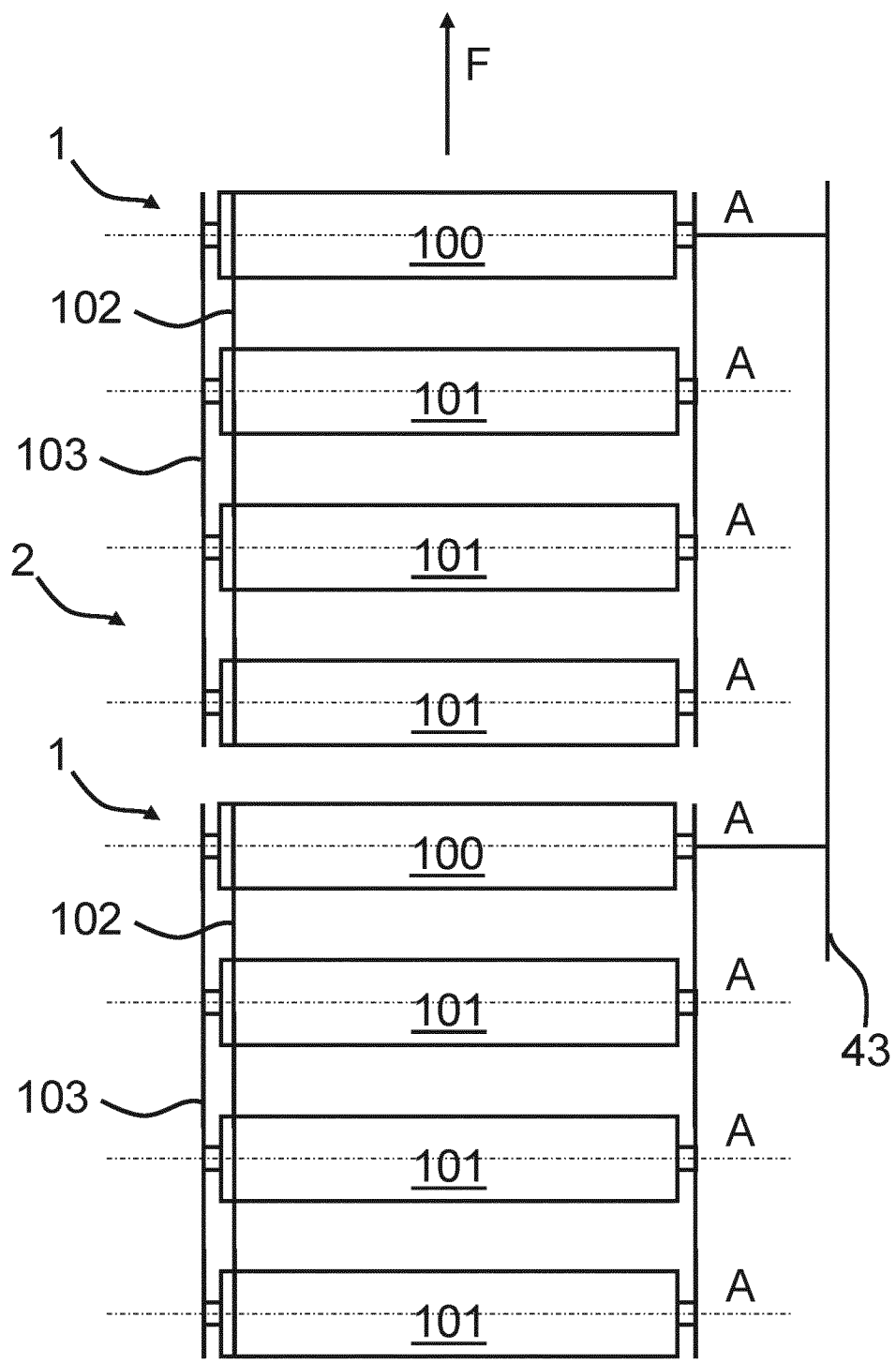
FIG. 4 shows a schematic plan view of a conveying device according to the invention.

For this purpose, the control unit 30 is connected by means of a bus line 43 to one or more further conveying arrangements, as shown in FIG. 4. For this purpose, the bus line 43 is led through the first axle element 15, which is designed as a hollow axle. Furthermore, a power line 44 is arranged through the hollow axle, which power line provides a transmission of electrical power for the drive unit 20, the control unit 30 and the sensor function unit 40. The electric motor 21 is connected by means of a line 42 to the control unit, and the sensor function unit 40 is connected by means of a signal line 41 to the control unit, and said line or signal line may be designed for analogue or digital transmission.

In particular, the sensor function unit 40 comprises a sensor for detecting the presence and absence of a conveyed material for conveying. For example, the sensor of the exemplary embodiment shown in FIG. 1 detects the presence of the conveyed material for conveying from a change in weight as soon as the conveyed material engages with the motor-operated conveying roller 100. The control unit then activates the drive unit in a manner dependent on said sensor signal and in a manner dependent on a predetermined characteristic profile to be selected, for example with a particular drive torque profile to a particular conveying speed. In the exemplary embodiment shown in FIG. 2, the electric motor 21 is itself the sensor function unit 40. In this preferred exemplary embodiment, the sensor signal is a magnetic field strength of the electric motor 21. By virtue of the conveyed material engaging with the motor-operated conveying roller 100, the roller body 10 rotates together with the rotor relative to the stator of the electric motor 21 and thus leads to a changing sensor signal. In the exemplary embodiment shown in FIG. 2, an analogue-digital converter unit 31 integrated in the control unit converts the analogue sensor signal into a digital signal for the activation of the drive unit.

Furthermore, the sensor function unit 40 may comprise a further sensor, for example a temperature sensor, which is designed to detect the temperature prevailing in the roller body and to signal this to the control unit. The temperature sensor serves for example for detecting an overload of the roller and for allowing the control unit to carry out a corresponding logical reaction, with outputting of corresponding control signals to the drive unit, on the basis of temperature data.

Figure 3:
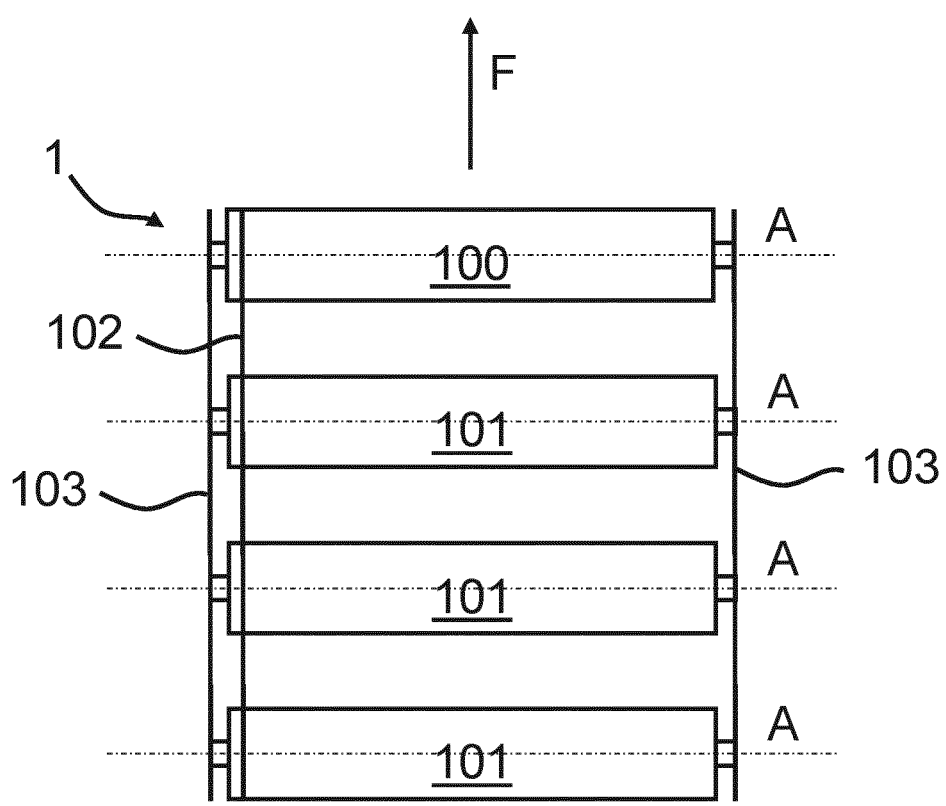
FIG. 3 shows a schematic plan view of a further preferred exemplary embodiment of the conveying arrangement according to the invention.

FIG. 3 shows a further exemplary embodiment of a conveying arrangement based on the conveying arrangement shown in FIG. 2. For this purpose, three passively driven conveying rollers 101 in the form of non-motor-operated conveying rollers form a conveying zone together with a motor-operated conveying roller 100. Like the motor-operated conveying roller 100, the passively driven conveying rollers 101 are mounted rotatably in a frame 103. The motor-operated conveying roller 100 drives the passively driven conveying rollers 101 by means of a poly-V belt 102. Through activation of a single motor-operated conveying roller 100, it is thus possible for the total of in each case three conveying rollers 101 in the respective conveying zone to be collectively set in rotation. By means of this arrangement, in each conveying zone, there is provided at least one sensor function unit that can detect the presence of a conveyed material for conveying in the respective conveying zone.

Furthermore, the passively driven conveying rollers 101 can signal a sensor signal for the activation of the drive unit 20. When the first conveying roller 101 in the conveying direction F enters into engagement with a conveyed material for conveying, this leads to a rotation of said conveying roller 101. The belt drive 102 transmits this rotational movement to the motor-operated conveying roller, which rotational movement can be detected by a rotational speed sensor, and the control unit can activate the drive unit correspondingly.

Finally, FIG. 4 shows a preferred exemplary embodiment of a conveying device 2 comprising two conveying arrangements 1 according to the exemplary embodiment shown in FIG. 3 arranged in series in the conveying direction F.

LIST OF REFERENCE NUMERALS

1 Conveying arrangement
2 Conveying device
10 Roller body
11 First end of the roller body
12 Second end of the roller body
13 End cap
14 End cap
14a Encircling grooves
15 Axle element, axle stub
16 Axle element
17 Rolling bearing
18 Rolling bearing
20 Drive unit
21 Electric motor
22 Transmission
30 Control unit
31 Analogue-digital converter unit
32 Memory unit
33 CPU, commutation electronics
40 Sensor function unit
41 Signal line
42 Control line
43 Bus line
44 Power line
100 Motor-operated conveying roller
101 Passively driven conveying roller
102 Poly-V belt
103 Frame
A Roller axis
F Conveying direction

The invention claimed is:

1. Conveying arrangement (1) for conveying a conveyed material, comprising
a motor-operated conveying roller (100), comprising
an axle element (16),
a roller body (10) mounted rotatably about a roller axis (A),
a drive unit (20) which is arranged within the roller body (10) and which is mechanically coupled to the roller body (10) and to the axle element (16) and which is designed to generate a torque between the axle element (16) and the roller body (10),
a sensor function unit (40) which is arranged within the roller body (10) and which is designed to detect a conveyed material for conveying by means of the motor-operated conveying roller (100), and
a control unit (30) which is connected, for the transmission of signals, to the sensor function unit (40), wherein the control unit (30) is designed to receive a sensor signal from the sensor function unit and to transmit a control signal to the drive unit (20) in a manner dependent on the sensor signal, wherein the control signal comprises data for the drive of the motor-operated conveying roller with a characteristic profile, which is predetermined by the control signal, in a conveying operating mode, wherein the control unit (30), arranged within the roller body (10), is designed to switch the drive unit (20) back and forth between a standby operating mode and a conveying operating mode in a manner dependent on a sensor signal and/or a control signal.

2. Conveying arrangement (1) according to claim 1, characterized in that the sensor function unit (40) provides an analogue signal as sensor signal.

3. Conveying arrangement (1) according to claim 1, characterized in that
the drive unit (20) comprises or is the sensor function unit (40), and/or
the sensor function unit (40) comprises or is a sensor separate from the drive unit.

4. Conveying arrangement (1) according to claim 1, comprising an analogue-digital converter unit (31) which is designed to convert the sensor signal into a digital signal, wherein
the control unit (30) comprises the analogue-digital converter unit (31), and/or
the sensor function unit (40) comprises the analogue-digital converter unit (31).

5. Conveying arrangement (1) according to claim 1, characterized in that the control unit (30),
for transmitting the sensor signal, is connected directly to the sensor function unit (40) by means of a signal line (41), and/or
for activating the drive unit (20), is connected to the latter via a control line (42), and/or for receiving the control signals and/or for transmitting operating data of the conveying arrangement (1), is connected to a bus line (43).

6. Conveying arrangement (1) according to claim 1, comprising a power interface for receiving a power supply in the form of a voltage supply with a voltage.

7. Conveying arrangement (1) according to claim 1, characterized in that the drive unit (20) comprises a brushless electric motor (21), and the control unit (30) comprises commutation electronics for activating the electric motor (21).

8. Conveying arrangement (1) according to claim 1, comprising a conveying roller (101) and a belt drive (102), wherein, for the drive of the conveying roller (101), the motor-operated conveying roller (100) is connected to the passively driven conveying roller (101) by means of the belt drive.

9. Conveying device (2) for conveying a conveyed material, comprising one or more conveying arrangements (1) according to claim 1.

10. Conveying arrangement (1) for conveying a conveyed material, comprising
- a motor-operated conveying roller (100), comprising
  - an axle element (16),
  - a roller body (10) mounted rotatably about a roller axis (A),
  - a drive unit (20) which is arranged within the roller body (10) and which is mechanically coupled to the roller body (10) and to the axle element (16) and which is designed to generate a torque between the axle element (16) and the roller body (10),
- a sensor function unit (40) which is arranged within the roller body (10) and which is designed to detect a conveyed material for conveying by means of the motor-operated conveying roller (100), and
- a control unit (30) arranged within the roller body (10); said control unit being connected, for the transmission of signals, to the sensor function unit (40), wherein the control unit (30) is designed to receive a sensor signal from the sensor function unit and to transmit a control signal to the drive unit (20) in a manner dependent on the sensor signal, wherein the control signal comprises data for the drive of the motor-operated conveying roller with a characteristic profile, which is predetermined by the control signal, in a conveying operating mode, wherein
  - the drive unit (20) switches from the standby operating mode to the conveying operating mode if the sensor signal signals a change from a free space to an occupied space or from an occupied space to a free space in a conveying direction (F), and/or
- the drive unit (20) switches from the conveying operating mode to the standby operating mode if the sensor signal signals a change from a free space to an occupied space or from an occupied space to a free space in the conveying direction (F).

* * * * *